Nov. 20, 1934.  C. A. CLARK  1,981,091
ARTIFICIAL BAIT
Filed Jan. 16, 1934
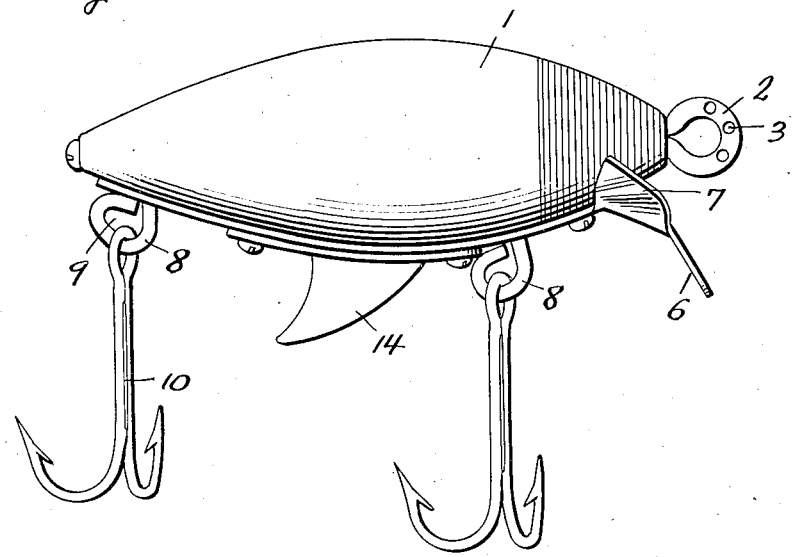
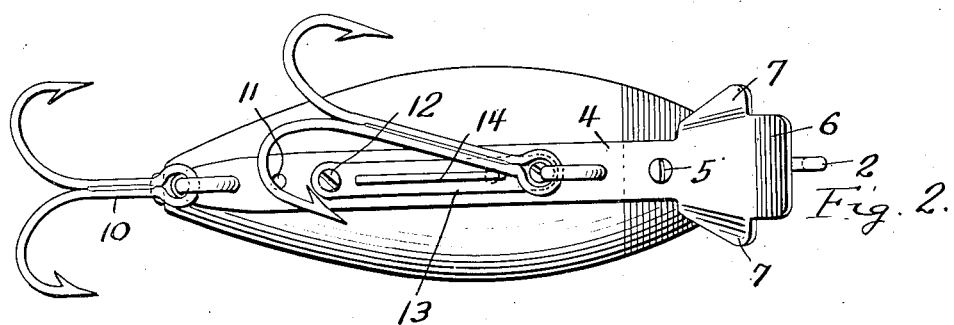
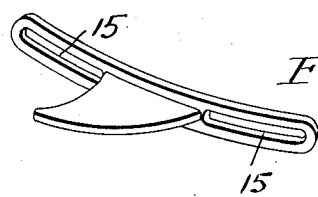
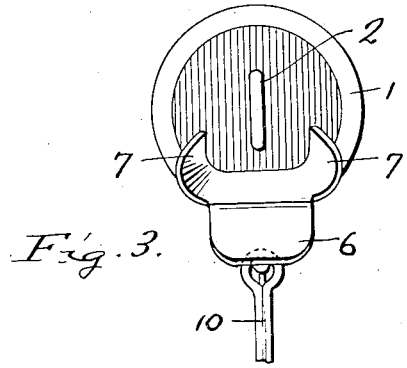
Inventor
Charles A. Clark
By Clarence A O'Brien
Attorney Patented Nov. 20, 1934

1,981,091

UNITED STATES PATENT OFFICE 1,981,091

ARTIFICIAL BAIT

Charles A. Clark, Springfield, Mo.

Application January 16, 1934, Serial No. 706,877

3 Claims. (Cl. 43—46)

This invention relates to an artificial bait, the general object of the invention being to provide means whereby the body of the bait is caused to move through the water in a life-like manner and swims with an even keel and does not roll or zig-zag and will not jump or spiral out of the water.

Another object of the invention is to provide means for adjusting the keel and to provide means whereby the connection of the line to the bait can be adjusted.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side view of the invention.

Figure 2 is a bottom plan view thereof.

Figure 3 is a view looking toward the front end.

Figure 4 is a view of a modified form of keel.

In this drawing, the numeral 1 indicates the body of the bait which is preferably of the shape shown in the drawing and a rod passes longitudinally through the body and has an eye 2 at its front end which is provided with the openings 3 so that the line can be either passed through the large part of the eye or through any one of these holes 3, the holes 3 permitting the line to be adjusted in connecting it with the bait so as to cause the bait to travel at different depths in the water.

An elongated plate 4 is connected to the bottom of the body by the screws 5 and the front end of this plate is enlarged and bent downwardly and forwardly, as shown at 6, and this enlarged portion has the upwardly and outwardly extending wings 7 on its side edges adjacent the upper part of the portion 6, with the upper ends of these wings contacting the body. Eye members 8 are also carried by the plate 4 and each eye member has an elongated rearwardly extending eye 9, as shown in Figure 1 for receiving the eyes of the hooks 10. This form of the eye members 8 eliminates the hooks fouling when the cast is made and it also permits the hook to lie against a body in casting which reduces wind resistance and permits the bait to shoot through the air like an arrow. The plate 4 is provided with a plurality of holes 11, any pair of which is adapted to receive the screws 12 which hold a plate 13 to the plate 4, this plate 13 carrying the keel 14. By providing a number of these holes 11, the keel plate can be adjusted forwardly or rearwardly and instead of providing the number of holes 11 in the plate 4, I may make the plate 13 with the elongated slots 15 therein, as shown in Figure 4, these slots receiving the screws 12 so that by slightly loosening these screws, the keel plate can be adjusted forwardly or rearwardly and then by tightening the screws, the plate is held in adjusted position.

This keel, with the members 6 and 7, gives the bait a life-like motion when it is drawn through the water and it will swim with an even keel and does not roll or zig-zag and will not jump or spiral out of the water. It swims perfectly in both swift or still water and draws very easily through the water, which makes it a very desirable bait for a light rod. It swims very deep and has plenty of action, even on a slow reel. By moving the keel rearwardly, the bait has a wider stroke and by moving the keel forwardly, it gives the bait a sharp, fast stroke. By moving the keel forwardly and then removing the front hook, a practically weedless bait is provided for which still retains the same motion and balance.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A bait of the class described comprising a body, a plate connected with the bottom thereof and having a forwardly and downwardly bent front end arranged adjacent the front end of the bait, with upwardly and outwardly extending wings on the upper portion of said bent part, the upper ends of the wings contacting the front part of the body, and a fin depending from the body.

2. A bait of the class described comprising a body, an elongated plate connected to the bottom of the same and having its front end sloping downwardly and forwardly, with the upper portion of said end provided with upwardly and outwardly extending wings at its side edges, and a keel carrying plate adjustably connected to the first mentioned plate.

3. A bait of the class described comprising a body tapering forwardly and rearwardly from its central portion, an elongated plate connected to the bottom of the body and having its forward end sloping downwardly and forwardly, upwardly and outwardly extending wings connected to the side edges of the upper portion of said end, a keel carrying plate adjustably connected with the first mentioned plate, an eye member carried by the first mentioned plate and having an elongated rearwardly extending eye part for receiving the eye of a fish hook, and an eye member having its eye part projecting from the front end of the body, with said eye part vertically arranged and having a row of spaced holes therein for receiving the end of a line.

CHARLES A. CLARK.